United States Patent
Kikuchi et al.

(10) Patent No.: US 6,700,283 B2
(45) Date of Patent: Mar. 2, 2004

(54) ROTATING ELECTRIC MACHINE AND METHOD OF MANUFACTURE THEREFOR

(75) Inventors: Toshio Kikuchi, Yokosuka (JP); Shinichiro Kitada, Tokyo (JP); Yutaro Kaneko, Yokohama (JP); Takashi Tsuneyoshi, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 1 day.

(21) Appl. No.: 09/986,047

(22) Filed: Nov. 7, 2001

(65) Prior Publication Data

US 2002/0074889 A1 Jun. 20, 2002

(30) Foreign Application Priority Data

Dec. 14, 2000 (JP) ........................................ 2000-379791

(51) Int. Cl.[7] .............................................. H02K 3/487
(52) U.S. Cl. ............................ 310/214; 310/42; 310/54
(58) Field of Search ........................... 310/214, 52, 54, 310/58, 59, 42

(56) References Cited

U.S. PATENT DOCUMENTS

| | | | | |
|---|---|---|---|---|
| 3,505,729 A | * | 4/1970 | Balke et al. ................... 29/596 |
| 4,227,108 A | * | 10/1980 | Washizu et al. ............. 310/214 |
| 4,843,271 A | * | 6/1989 | Shah ............................ 310/214 |
| 5,866,959 A | * | 2/1999 | Le Flem ....................... 310/51 |

FOREIGN PATENT DOCUMENTS

| | | | | |
|---|---|---|---|---|
| EP | 1215800 | * | 6/2002 | .......... H02K/3/487 |
| JP | 53-95207 | | 8/1978 | ............ H02K/9/19 |
| JP | 4-364343 | | 12/1992 | ............ H02K/9/19 |

* cited by examiner

Primary Examiner—Burton Mullins
(74) Attorney, Agent, or Firm—Foley & Lardner

(57) ABSTRACT

This invention provides a rotating electric machine using an inner section of a slot of a stator as a cooling passage and allowing a high cooling efficiency. Furthermore, it provides a manufacture method for the rotating electric machine which allows streamlining of the manufacture of the cooling passage. A plate is attached to the plate retaining groove formed in proximity to the opening of the slot of the stator. A resin layer is formed by injection of resin into a space formed between the outer face of the plate and the mold set on an inner peripheral face of the stator. The plate is pressed by the injection pressure of the resin to come into close contact with the stopper and to create a seal which prevents leakage of resin into the slot. A leg is provided on the plate and extends into the slot for reducing the cross sectional surface area of the cooling passage.

8 Claims, 10 Drawing Sheets

ROTATING ELECTRIC MACHINE AND METHOD OF MANUFACTURE THEREFOR

FIELD OF THE INVENTION

This invention relates to a rotating electric machine and method of manufacture therefor. The rotating electric machine is used as a motor, or as a generator, or as a motor/generator.

BACKGROUND OF THE INVENTION

Tokkai Sho 53-95207 published by the Japanese Patent Office in 1978 and Tokkai Hei 4-364343 published by the Japanese Patent Office in 1992 disclose a rotating electric machine directly cooling stator coils by using an inner section of a slot of a stator as a cooling passage.

The rotating electric machine disclosed in Tokkai Sho 53-95207 comprises a covering layer which closes the slot opening. After allowing paste resin filling the slot opening to harden, the covering layer is formed by spraying ceramic material onto the inner peripheral face of the stator. A cooling medium is introduced into an inner section of the slot defined in this manner. However this method entails the problem that it is difficult to perform paste resin filling when the width of the slot opening reaches a certain dimension.

On the other hand, the rotating electric machine disclosed in Tokkai Hei 4-364343 has the covering layer by injecting engineering plastic to fill a space and allowing the plastic to harden. The space is defined by the stator core and a mold disposed inside the slot and the inner peripheral side of the stator. In contrast to the rotating electric machine disclosed in Tokkai Sho 53-95207, this method can be employed irrespective of the width of the slot opening. Therefore since this method does not entail the necessity to perform a designated process such as spraying the ceramic material, the cooling passage may be formed in a relatively cost-effective manner.

SUMMARY OF THE INVENTION

However the method disclosed in Tokkai Hei 4-364343 requires the molds disposed respectively in the inner peripheral side of the stator and the inner section of the slot to be removed after the injected engineering plastic material has hardened. As a result, this may cause a variety of problems. For example, removal of the mold disposed in the inner section of the slot may result in damage to the stator cores by detaching or bending the thin magnetic steel plate comprising the stator cores.

Furthermore although the space formed after removing the mold constitutes a section of the cooling passage, since this space is separate from the stator coils, a preferred cooling effect can not be obtained. Thus the cross-sectional area of the cooling passage is actually needlessly increased by an area corresponding to the space. Consequently the flow amount of the cooling medium for creating the required oil cooling effect must be increased and therefore the capacity of the pump circulating the cooling medium must be increased as a result.

It is therefore an object of this invention to provide a rotating electrical machine which uses the inner section of a slot of a stator as a cooling passage and a method of manufacture therefor in order to obtain a high cooling effect and to streamline the manufacture of the cooling passage.

In order to achieve above objects, this invention provides a rotating electric machine having a stator housing coils in a slot, the opening of the slot being closed, and a cooling passage formed on an inner section of the slot, the rotating electrical machine comprising a plate disposed in proximity to the opening of the slot and a resin layer formed onto the outer face of the plate, the plate and the resin layer closing the opening of the slot.

Further this invention provides a manufacturing method for a rotating electric machine having a stator housing coils in a slot, a rotor, and a cooling passage in the slot of the stator, the manufacturing method comprising disposing a plate inside the slot opening and closing the slot opening by injecting resin on the outer face of the plate.

The details as well as other features and advantages of this invention are set forth in the remainder of the specification and are shown in the accompanying drawings.

DESCRIPTION OF THE PREFERRED EMBODIMENTS

Figure 1:
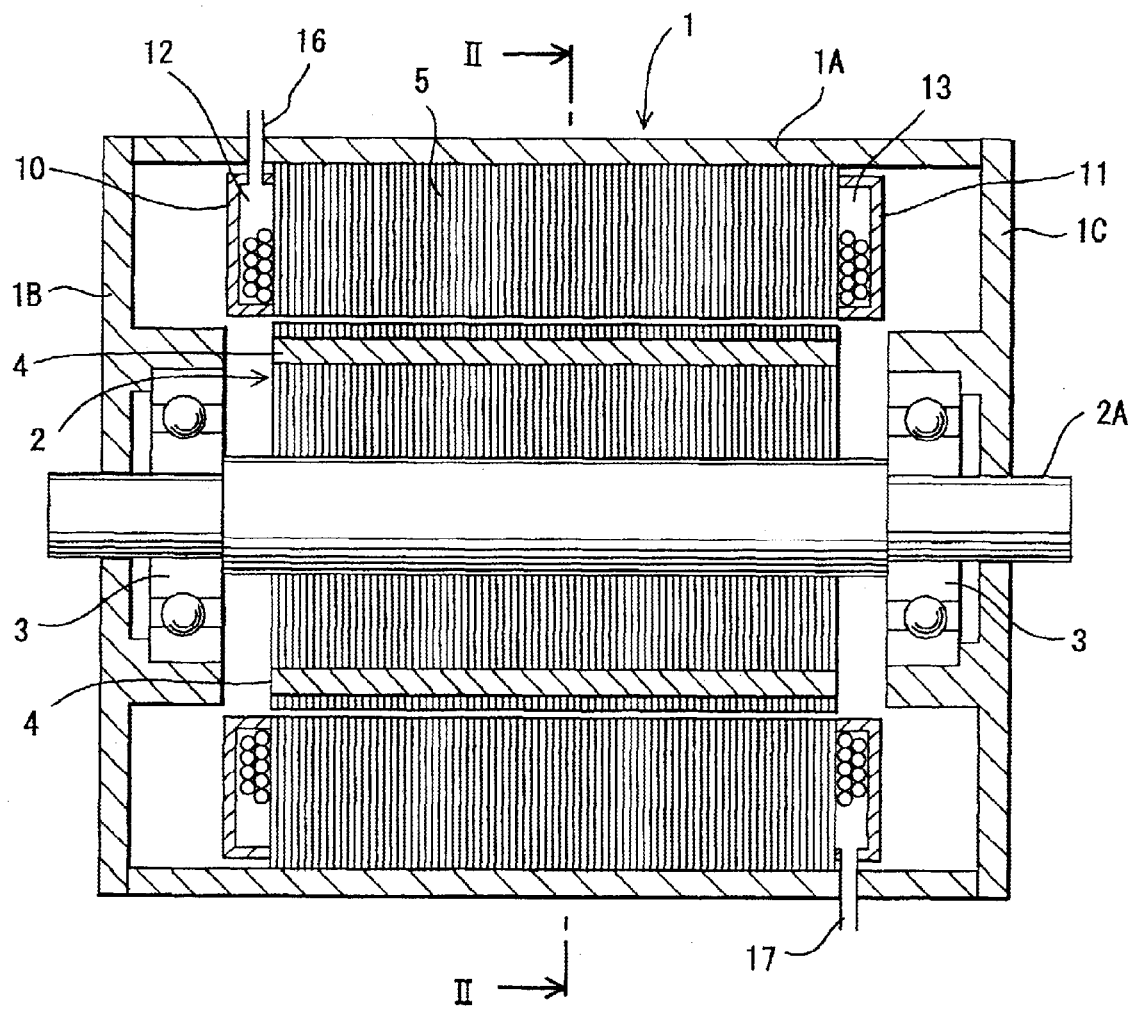
FIG. 1 is a sectional view of a rotating electric machine according to the first embodiment of this invention.

Referring to FIG. 1, the case 1 of the rotating electric machine comprises a cylindrical plate 1A and lateral plates 1B, 1C covering an opening on both axial ends of the cylindrical plate 1A.

A columnar rotor 2 is housed in the case 1. The rotor 2 rotates about the rotation shaft 2A. Both ends of the rotation shaft 2A of the rotor 2 are supported on lateral plates 1B, 1C through respective bearings 3. Furthermore a magnet 4 is provided in proximity to the outer peripheral face of the rotor 2.

A cylindrical stator 5 is mounted on the inner peripheral face of the cylindrical plate 1A, encircling the rotor 2. A predetermined gap is provided between the inner peripheral face of the stator 5 and the outer peripheral face of the rotor 2. The width of the predetermined gap is less than 1.0 mm.

Figure 2:
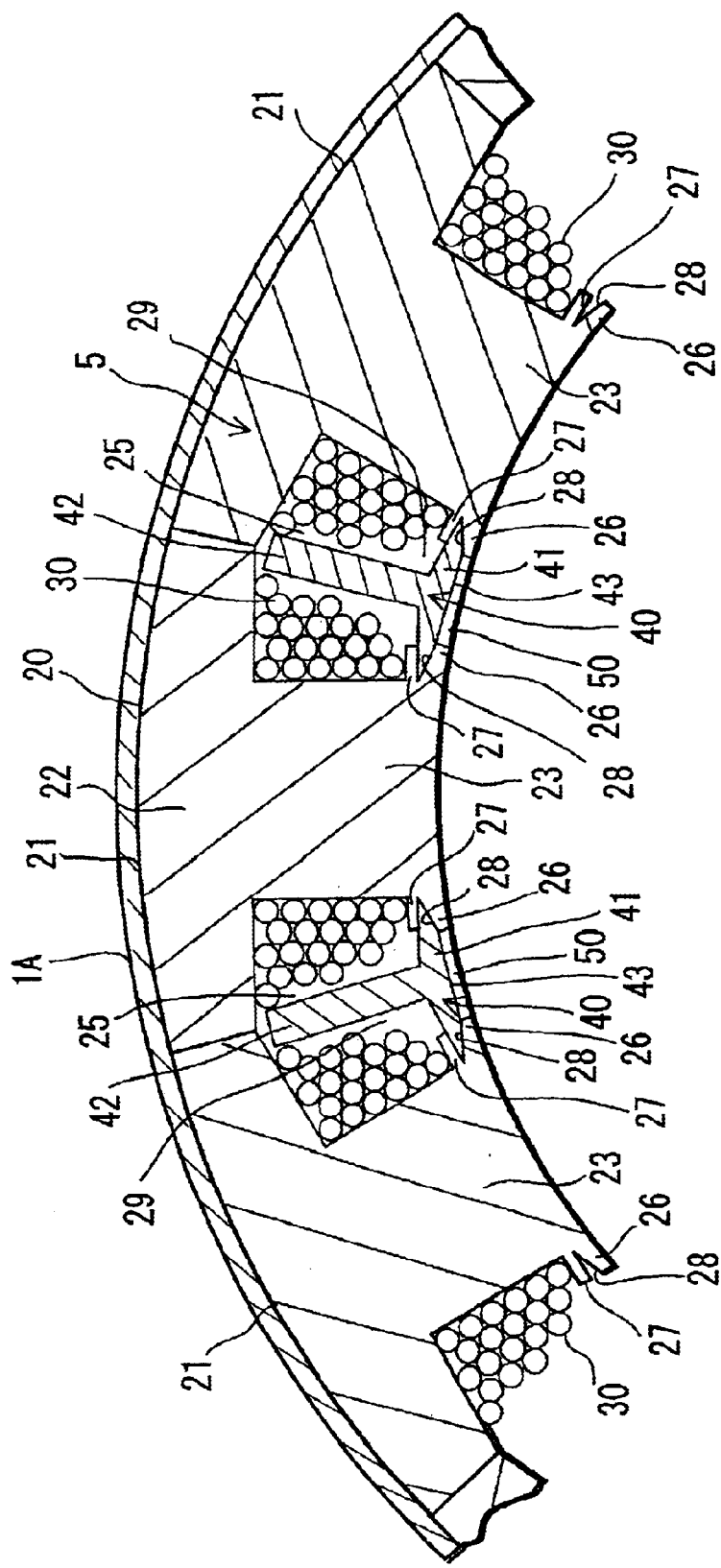
FIG. 2 is a partially sectional view of a rotating electric machine, showing a section of FIG. 1 along the line II—II according to the first embodiment of this invention.

The ring-shaped oil jackets 10, 11 with a U-shaped cross section are respectively mounted on both axial ends of the stator 5. Oil chambers 12, 13 are formed between the end face of the stator 5 and the inner side of the oil jackets 10, 11. Cooling oil is supplied to an oil chamber 12 through an oil supply mouth 16 which is formed in the oil jacket 10 and passes through the cylindrical plate 1A. The cooling oil is introduced into the oil chamber 13 through the cooling passage 29 formed in the stator 5 as shown in FIG. 2. The cooling oil introduced into the oil chamber 13 is discharged to the outside from an oil discharge mouth 17 which is formed in the oil jacket 11 and passes through the cylindrical plate 1A.

Referring to FIG. 2, the stator 5 comprises a stator core 20 and coils 30 wound on the stator core 20.

The stator core 20 with a cylindrical shape is formed by connecting a plurality of divided cores 21. That is to say, the stator core 20 comprises divided cores. In this embodiment, the number of divided cores is twelve. Each of the divided cores 21 is formed by laminating a fixed number of T-shaped magnetic steel plates with respect to the rotation shaft 2A of the rotor 2. That is to say, the plates are laminating perpendicular to the surface of the page in FIG. 2. Three of the twelve divided cores 21 included in the stator core 20 are shown in FIG. 2. The fixed number is determined by the thickness of the T-shaped magnetic steel plate and the required size of the stator core 20.

The stator core 20 is provided with a ring-shaped back core 22 and a plurality of teeth 23. The back core 22 is provided along the inner peripheral face of the cylindrical plate 1A of the case 1 and the teeth 23 projects radially from the back core 22 towards the inner peripheral side of the stator core 20. The indentation between adjacent teeth 23, that is to say, the groove comprises the slot 25. The coils 30 form concentrated windings on each of the teeth 23 and are housed in the slot 25.

Projections 26 are provided on both lateral faces near the tip of the teeth 23, namely, on an inner peripheral face near the opening of the slot 25. A stopper 27 is provided in closer proximity to the base of the teeth 23 than the projection 26, that is to say, more towards the interior of the slot 25. The stopper projects from the inner peripheral face of the slot 25. The groove between the projection 26 and the stopper 27 forms a plate retaining groove 28 for retaining the plate 40. The stopper 27 has the function of supporting the plate 40 when filling the resin layer 50 and the function of determining the range of windings of coils 30 on the teeth 23.

The opening of each slot 25 is closed by a plate 40 and the resin layer 50. In this manner, the space in the slot 25 comprises the cooling passage 29 allowing flow of cooling oil.

Figure 7:
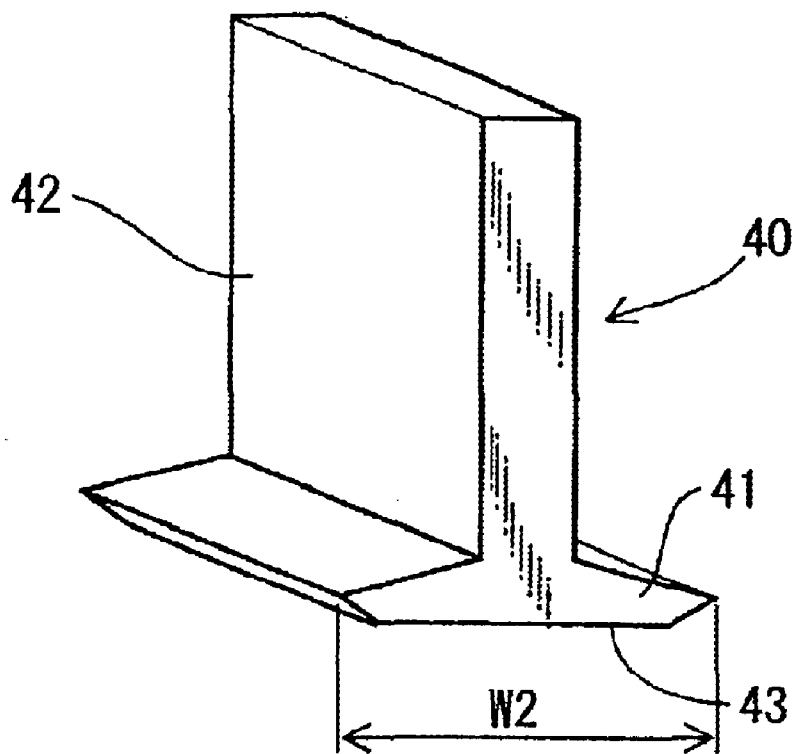
FIG. 7 is a perspective view showing a plate according to the first embodiment of this invention.

As shown in FIG. 7, the plate 40 comprises a main section 41 mounted in the opening of the slot 25 and a leg 42 extending from a substantially central section of the rear face of the main section 41 towards the inner section of the slot 25. The resin layer 50 is formed by injection filling of resin on the outer face 43 of the plate 40. The outer face 43 of the plate 40 is a surface facing the outer direction of the slot 25, namely the inner peripheral side of the stator core 5.

Both sides of the plate 40 are supported in the plate retaining groove 28 as discussed above. The dimensions of the main section 41 of the plate 40 and the plate retaining groove 28 are set so that a suitable play results between the main section 41 and the plate retaining groove 28. This play allows the surface of the main section 41 facing the inner direction of the slot 25 pressed during filling of the resin layer 50 into close contact with the support face of the stopper 27. Therefore, it is possible to prevent injected resin from leaking into the slot 25. The plate 40 is fixed to a suitable position through support with the stopper 27, coming into close contact with the stopper 27.

It is preferred that the plate 40 is formed from a resilient material. Forming the plate 40 from a resilient material allows the stopper 27 to bite into the plate 40 resulting in a better seal.

The leg 42 of the plate 40 is disposed in a substantially central section of the slot 25. The cross sectional area of the leg 42 has the function of reducing the cross sectional surface area of the cooling passage 29. Therefore, the cooling passage 29 is limited to a region with a small cross sectional area in proximity to the coils 30. Since a cooling medium such as cooling oil flows through the narrow region in proximity to the coils 30, cooling is performed efficiently.

Furthermore it is possible to reduce the amount of cooling oil passing through the cooling passage 29. That is to say, while maintaining a flow amount of cooling oil, cooling efficiency is improved by reducing the cross sectional area of the cooling passage 29 and increasing the flow speed of oil. As a result, the capacity of the oil recirculation pump required to obtain the sufficient cooling effect can be reduced. Furthermore it is possible to regulate the cross sectional area of the cooling passage 29 by changing the width of the leg 42.

The length of the leg 42 is set to a length which allows the formation of a space with the bottom of the slot 25, namely with the back core section 22. In this manner, the seal resulting from the supporting face of the stopper 27 and the inner face of the plate 40 is not impeded by the back core section 22.

The leg 42 does not abut with the bottom of the slot 25 when the plate 40 is not under the filling pressure. However this space takes the size allowing contact of the tip of the leg 42 with the bottom of the slot 25 when the filling pressure deforms the main section 41 of the plate 40. Hence, the deformation of the plate 40 is limited to within a fixed amount regulated by the space during resin injection. When the amount of deformation of the plate 40 is limited thus, it is possible to select a relatively soft material with low stiffness as the material for the plate 40. Furthermore it is possible to set the filling pressure to a relatively high level. As a result, the sealing characteristics of the inner face of the plate 40 and the support face of the stopper 27 are increased to create an improved seal.

Next, a manufacturing method for the rotating electric machine according to this embodiment will be described with reference to FIG. 3 to FIG. 8.

Figure 3:
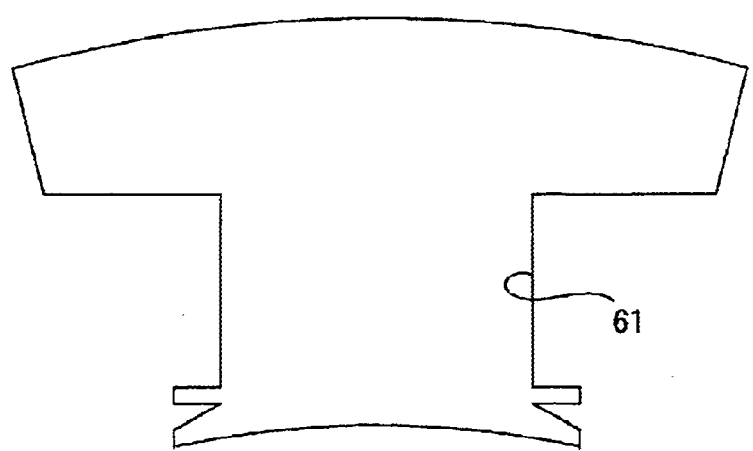
FIG. 3 shows the shape of a mold cavity for press forming magnetic steel plate according to the first embodiment of this invention.
Figure 4:
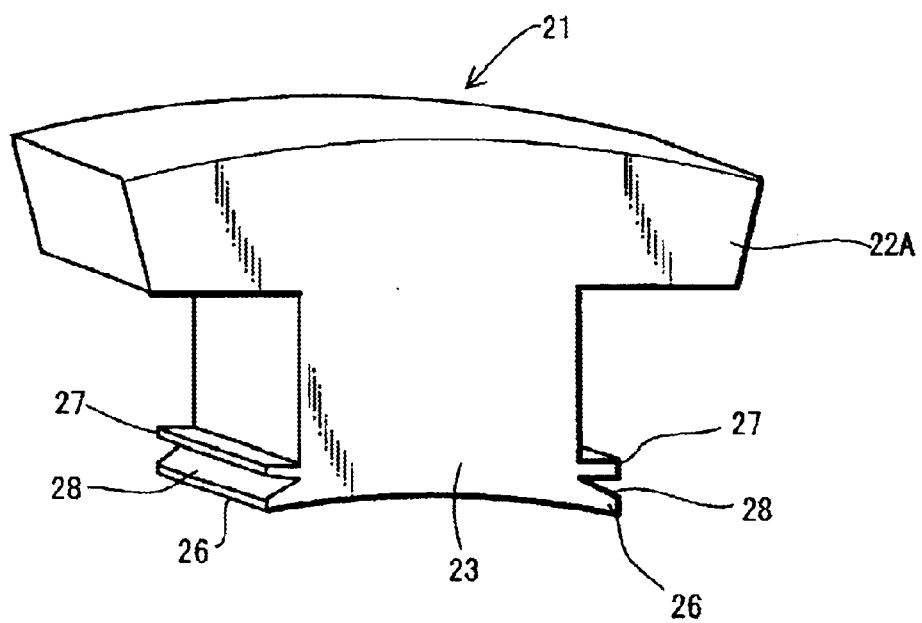
FIG. 4 is a perspective view showing a divided core according to the first embodiment of this invention.

Firstly referring to FIG. 3, a T-shaped magnetic steel plate is formed by a pressing process using a mold cavity 61. Next, a fixed number of the T-shaped magnetic steel plates are laminated. In this manner, a number of divided cores 21 required for the stator 5 are formed as shown in FIG. 4. In this embodiment, the required number of cores is twelve.

Referring to FIG. 4, the divided cores 21 are provided with arcuate back core sections 22A projecting transversely and teeth 23 extending substantially orthogonal to, and from the back core sections 22A. The back core section 22A comprises a part of the back core section 22 of the stator core 20. A projection 26, plate retaining groove 28 and stopper 27 are formed in proximity to the tip of the teeth 23.

Figure 5:
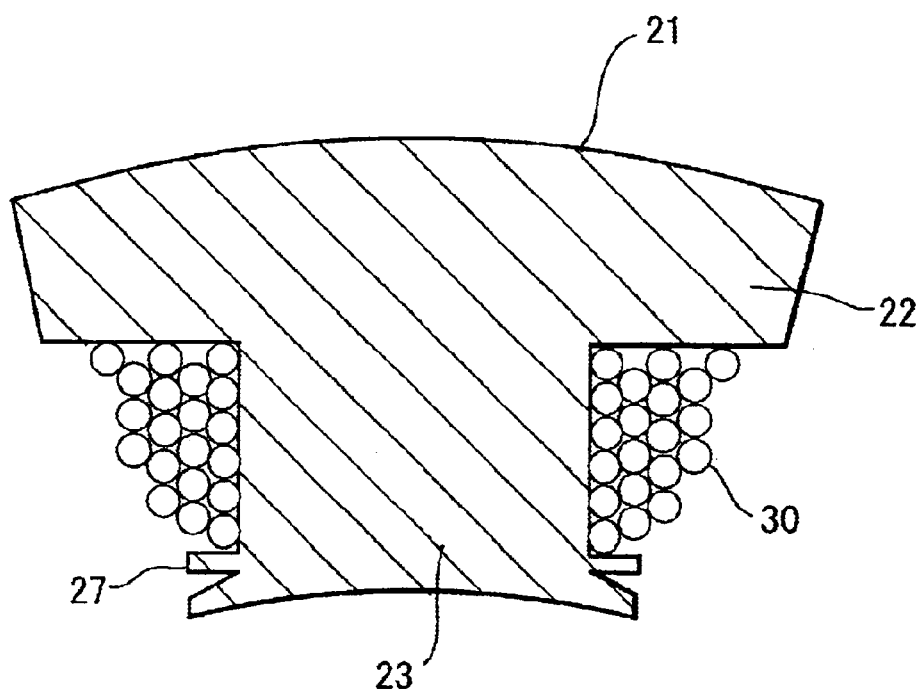
FIG. 5 is a sectional view showing coils wound onto the divided core according to the first embodiment of this invention.

Referring to FIG. 5, coils 30 are formed by winding wire on the teeth 23 between the stopper 27 and the back core section 22A. The coil windings are performed across a fixed layer with a fixed number of windings (number of turns).

In this embodiment, there are six turns in the wire in a first layer. The wire turns are performed from the base of the teeth 23 towards the tip without spaces in a range from immediately after the back core section 22A up to immediately before the stopper 27. Next, the windings of a second layer comprising five wire turns are performed back from the end of the first layer, from the tip of the teeth 23 towards the base on top of the wire comprising the first layer. Hereafter in the same manner, a third layer comprising five wire turns, a fourth layer comprising three wire turns and a fifth layer comprising one wire turn are performed in sequence. Thus, a total of twenty wire turns are performed on the teeth 23 of the divided cores 21. It is possible to facilitate the coil winding operation in a divided core structure, unlike in an integrated stator.

Figure 6:
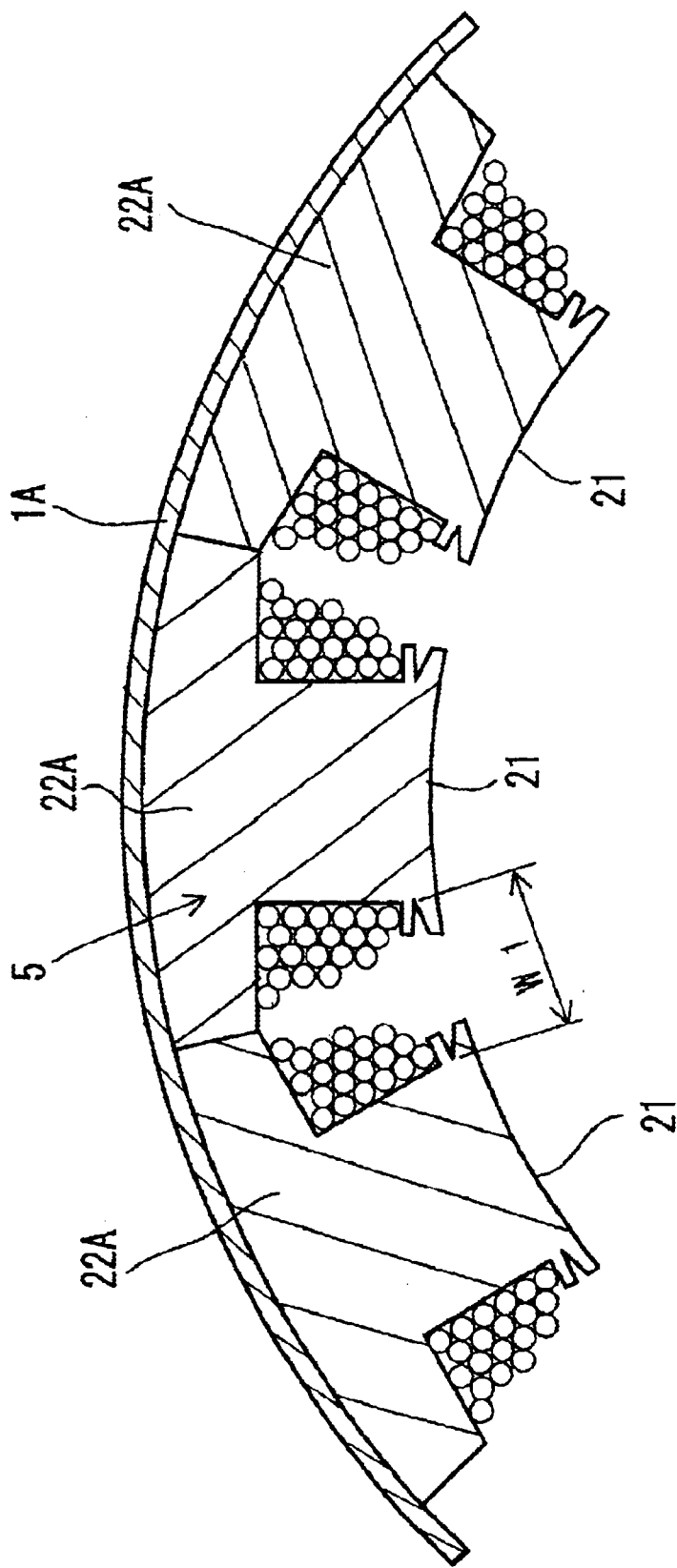
FIG. 6 is a partially sectional view showing a stator core fitted in a cylindrical section of a case according to the first embodiment of this invention.

Referring to FIG. 6, twelve divided cores 21 with coils 30 wound thereon are disposed in a cylindrical shape inside the case 1. The divided cores 21 are mounted by insertion along the inner peripheral face of the cylindrical plate 1A of the case 1. In FIG. 6, three of the twelve divided cores 21 attached to the case 1 are shown as an example. Mounting the divided cores 21 on the cylindrical plate 1A is performed by shrink fitting for example. Thus the twelve divided cores 21 come into close contact with both sides of the back core sections 22A. In this manner, a stator 5 is formed which has the same function as an integrated stator.

Figure 8:
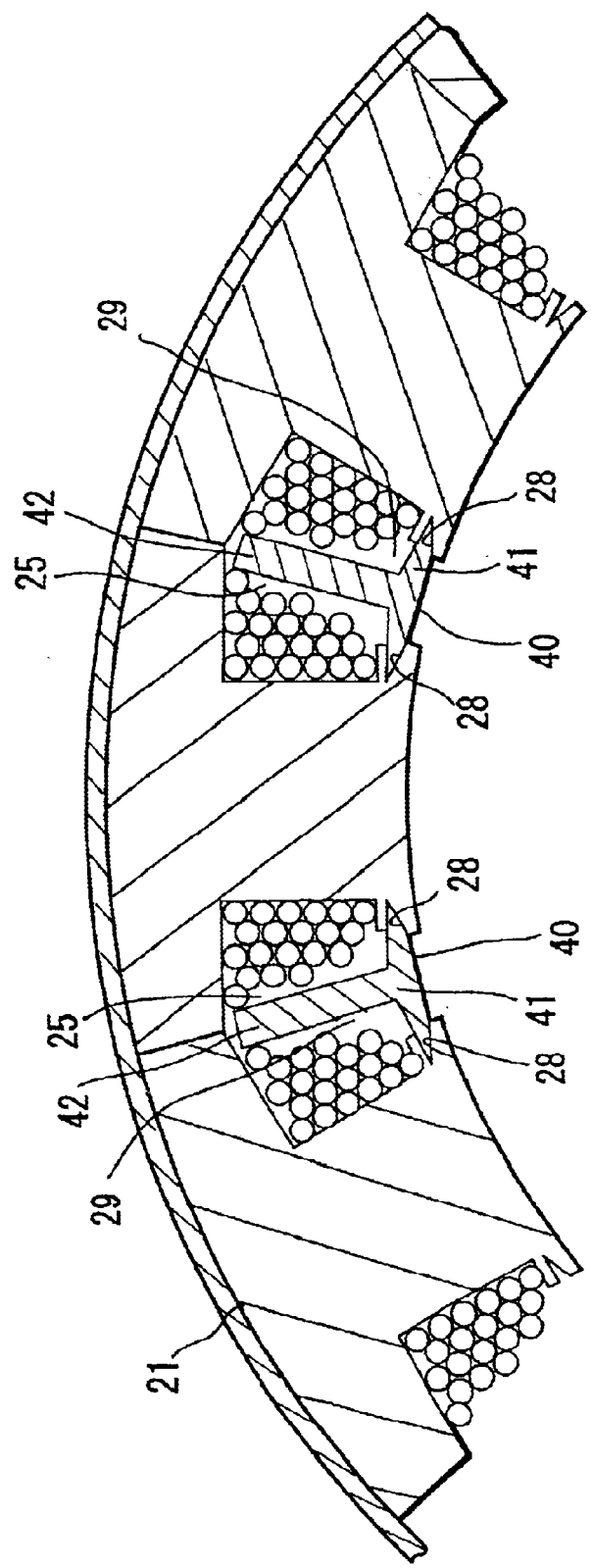
FIG. 8 is a sectional view showing plates fitted to the stator core according to the first embodiment of this invention.

Referring to FIG. 8, both sides of the main section 41 of the plate 40 as shown in FIG. 7 are attached to the plate retaining groove 28. Furthermore the plate 40 is inserted from the rotating axial direction (a direction perpendicular to the surface of the page in FIG. 8) of the rotor 2 into the slot 25 so that the leg 42 is housed inside the slot 25. Furthermore the play of a certain degree as described above is provided between the plate 40 and the plate retaining groove 28.

Figure 9:
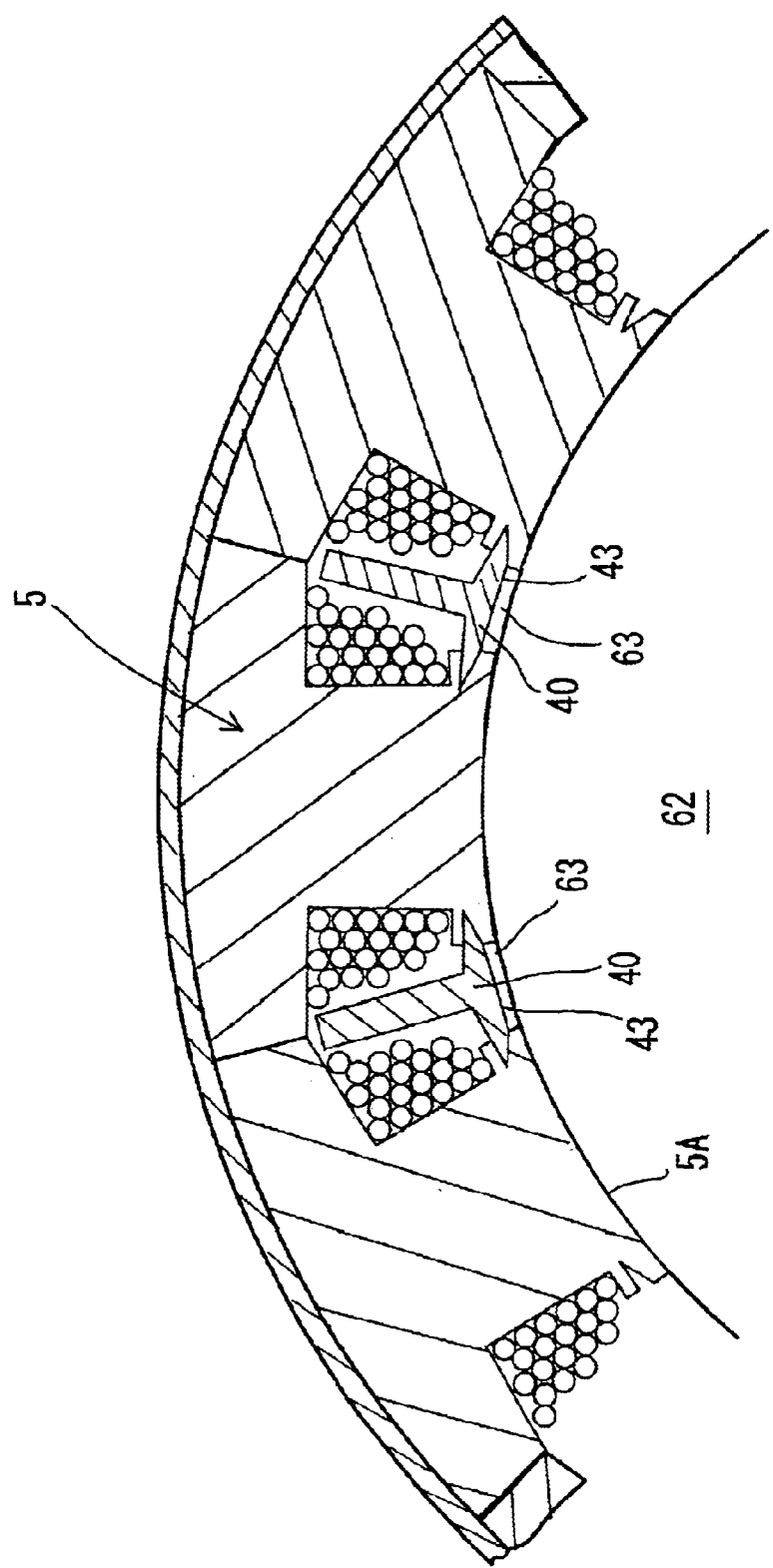
FIG. 9 is a sectional view of the shape of a resin layer according to the first embodiment of this invention.

Referring to FIG. 9, a mold 62 is set on an inner peripheral face 5A of the stator 5. The mold 62 is removed after resin has hardened. The resin is injected under a predetermined pressure into the space 63 formed between the outer face 43 of the plate 40 and the mold 62. The predetermined pressure is of the order of several hundred kgf/cm$^2$. In this manner, a resin layer 50 comprising hardened resin as shown in FIG. 2 is formed on the outer face 43 of the plate 40.

Next, the ring-shaped oil jackets 10, 11 with a U-shaped cross section are respectively mounted on both axial ends of the stator 5. Then, the rotor 2 is mounted on the case 1 through bearings 3.

The outer face 43 of the plate 40 comes into close contact with the support face of the stopper 27 of the stator 5 as a result of the pressure during resin injection. Thus a seal preventing leakage of injected resin into the slot 25 is created. Since a high pressure is used to inject the resin, resin fills all corners of the space 63 and improves the resin layer 50.

The resin layer 50 is formed on an outer face 43 of the plate 40 which is not removed after resin injection. A die (mold) is not used inside the slot 25. Thus the problem of bending etc. of the magnetic steel plates does not arise since the manufacturing step of removing the die after formation of the resin layer 50 is omitted.

A method not using an injection pressure (filling pressure) may be employed as a method of sealing the resin. For example, a method may be used of setting the width W2 of the main section 41 of the plate 40 to be slightly larger than the interval W1 (refer to FIG. 6) of the plate retaining groove 28 between adjacent teeth 23. When attaching the plate 40 to the plate retaining groove 28, this method allows the lateral section of the plate 40 to be in close contact with the bottom of the plate retaining groove 28. Although this method is effective for an integrated stator core, it is not effective for a stator core comprising divided cores because maintaining the accuracy of the interval W1 is difficult when the stator core 20 comprises divided cores as in the present embodiment. Thus when using divided cores, the close contact of the plate 40 with the stopper 27 is ensured by the injection pressure as in the present embodiment.

Since the stator core 20 comprises laminated magnetic steel plates, some unevenness in its lateral face, including the support face of the stopper 27 can not be avoided. When the degree of unevenness is large, even when the main section 41 of the plate 40 is in close contact with the lateral face of the teeth 23 or the stopper 27, it is possible that seal characteristics will not be sufficiently maintained. In this event, it is desirable that the plate 40 is attached after pre-coating an adhesive on the main section 41 of the plate 40 or the plate retaining groove 28.

As described above, according to this embodiment, the resin layer 50 is formed by injection of resin onto the top of an outer face 43 of the plate 40. However the plate 40 differs from the die (mold) provided inside the slot 25 and functions as a closing member for the opening of the slot 25 together with the resin layer 50. After formation of the resin layer 50, the plate 40 is not removed. Thus the problem of damage to the stator is avoided. Such damage may result from bending of the magnetic steel plates comprising the stator as a result of operations after formation of the resin layer, for example, the removal operation when using a die.

Furthermore since the resin is injected with a pressure of several hundred kgf/cm$^2$, resin reaches all corners of the space to be filled and it is possible to obtain an improved resin layer. Thus a type of rotating electric machine using the inner section of the slot 25 as a cooling passage 29 can be efficiently manufactured according to the present embodiment and allows improved performance in the resulting rotating electric machine.

The inner face of the plate 40 pressured during injection of resin is supported by close contact with the support face of the stopper 27. Therefore it is possible to effectively prevent leakage of resin into the slot 25. Furthermore if the plate is formed from a resilient material such as resin, high airtight characteristics are obtained between the plate 40 and the stopper 27 since the stopper 27 bites into the plate 40. Therefore improved seal characteristics of the slot 25 can be ensured.

When the plate 40 (main section 41) deforms during resin injection, the deformation is limited by abutment of the leg 42 with the bottom of the slot 25. Thus the plate 40 may comprise a low rigidity material and the injection pressure may be set to a relatively high level. As a result, the airtight characteristics of a section of the stopper 27 with the plate 40 are increased and it is possible to further ensure the seal characteristics.

A second embodiment of this invention will be described referring to FIG. 10. This embodiment has a conspicuous difference from the first embodiment with respect to the plate.

Figure 10:
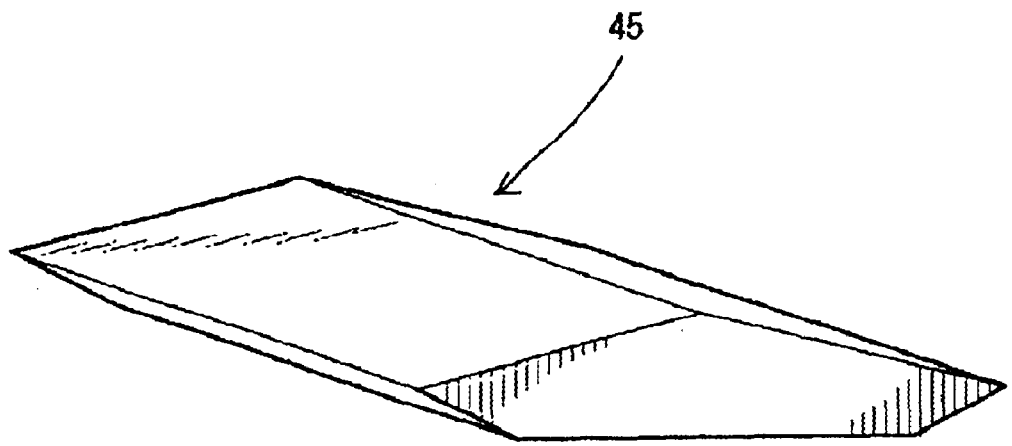
FIG. 10 is a perspective view showing a plate according to the second embodiment of this invention.

Referring to FIG. 10, the plate 45 in the second embodiment only comprises main section without the leg in contrast to the plate 40 in the first embodiment above. When the material for the plate is a relatively hard material having high rigidity, it is possible to use the plate 45 according to this embodiment because it is not necessary to limit deformation with the plate 45. When it is necessary to regulate the surface area of the cooling passage 29, a projection similar to the leg may be provided on a central section of the plate.

Figure 11:
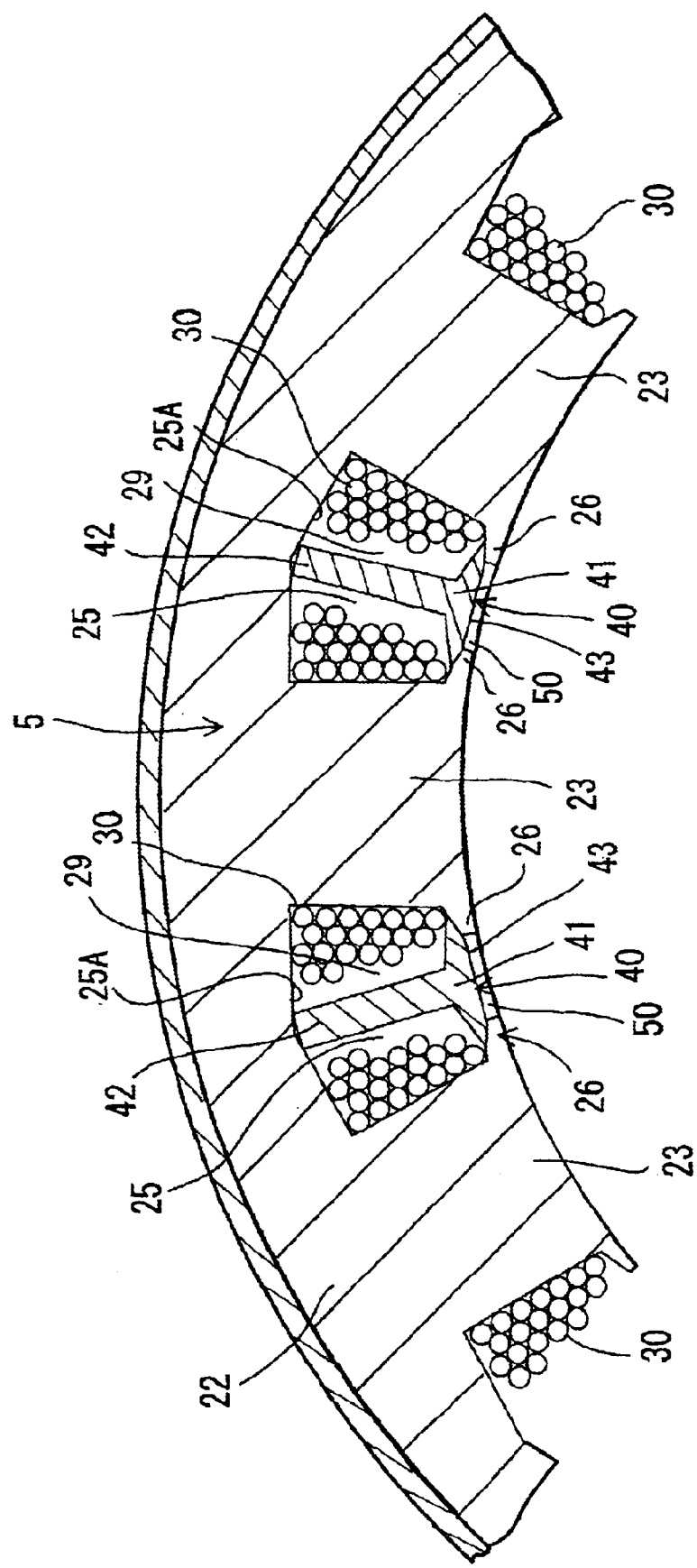
FIG. 11 is a partially sectional view of the rotating electric machine according to the third embodiment of this invention.

A third embodiment of this invention will be described with reference to FIG. 11.

In the third embodiment, airtight characteristics result from the abutment of the leg section 42 of the plate 40 with the slot bottom 25A (back core section 22) and the abutment of the outer face of the plate 40 with the inner face (surface facing the inner side of the slot 25) of the projection 26. That is to say, in this embodiment, the plate 40 is supported by the slot bottom 25A due to the length of the leg 42 of the plate 40 allowing abutment with the slot bottom 25A. As a result, the outer face of the plate 40 comes into close contact with the projection 26 and creates a seal during resin injection. This arrangement does not require a stopper 27 to project from the lateral face of the teeth 23 as in the first embodiment. Thus it is possible to simplify the shape of the teeth 23 and to simplify the process of punching the magnetic steel plates.

In order for this arrangement to create a seal during resin injection, the dimensional accuracy of each section of the stator core 20 must be relatively high. As a result, in this embodiment, an integrated stator core is used in order to maintain such accuracy. However as along as the airtight characteristics of the support face of the projection 27 and the outer face 43 of the plate 40 are maintained, this structure may be applied to the stator core with a divided structure.

The entire contents of Japanese Patent Applications P2000-379791 (filed Dec. 14, 2000) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A rotating electric machine having a stator housing coils in a slot, an opening of the slot being closed, and a cooling passage formed on an inner section of the slot, the rotating electrical machine comprising:

a plate disposed in proximity to the opening of the slot; and a resin layer formed on an outer face of the plate, the plate and the resin layer closing the opening of the slot, wherein the plate comprises a leg extending into the slot.

2. The rotating electric machine as defined in claim 1, wherein the leg is disposed in a substantially central section of the slot.

3. A rotating electric machine having a stator housing coils in a slot, an opening of the slot being closed, and a cooling passage formed on an inner section of the slot, the rotating electric machine comprising:

a plate disposed in proximity to the opening of the slot;

a resin layer formed on an outer face of the plate, the plate and the resin layer closing the opening of the slot; and a stopper projecting from an inner peripheral face of the slot, wherein the plate comes into contact with the stopper.

4. The rotating electric machine as defined in claim 3, wherein the plate is formed from a resilient material.

5. The rotating electric machine as defined in claim 3, wherein the plate comprises a leg extending into the slot, and the length of the leg is adapted so that the leg does not abut with the bottom of the slot when the plate is not under pressure.

6. The rotating electric machine as defined in claim 5, wherein when the plate is deformed by pressure during injection of resin, deformation of the plate is suppressed by abutment with the bottom of the slot.

7. The rotating electric machine as defined in claim 3, wherein the plate is fixed to the slot by an adhesive coating disposed between the plate and the inner peripheral face of the slot.

8. A rotating electric machine having a stator housing coils in a slot, an opening of the slot being closed, and a cooling passage formed on an inner section of the slot, the rotating electric machine comprising:

a plate disposed in proximity to the opening of the slot, the plate including a leg abutting a bottom surface of the slot opposite the opening of the slot;

a resin layer formed on an outer face of the plate, the plate and the resin layer closing the opening of the slot; and a projection including a surface facing the inner section of the slot, the projection projecting from an inner peripheral face of the slot, wherein the projection is disposed at a position closer to the rotor than the plate in proximity to the opening of the slot, and the outer face of the plate comes into close contact with the surface of the projection facing the inner section of the slot due to the leg abutting the bottom surface of the slot.

* * * * *